United States Patent [19]

Hayes et al.

[11] Patent Number: 4,880,668
[45] Date of Patent: Nov. 14, 1989

[54] MIRROR PROTECTIVE COMPOSITION COMPRISING 2-MERCAPTOTHIAZOLINE

[75] Inventors: Deborah E. Hayes, Verona; Alan B. Weissberg, Pittsburgh; Charles B. Friedlander, Glenshaw; Edward T. Ryan, Harwick, all of Pa.

[73] Assignee: PPG Industries, Inc., Pittsburgh, Pa.

[21] Appl. No.: 845,168

[22] Filed: Mar. 27, 1986

[51] Int. Cl.$^4$ ............................................. B05D 5/06
[52] U.S. Cl. ................................ 427/162; 427/407.2; 428/410; 428/687; 528/109
[58] Field of Search ................ 528/109; 106/14.16, 106/14.37; 427/162, 165, 168, 169; 428/410, 687; 350/320, 641, 642; 523/429; 252/391, 394, 402

[56] References Cited

U.S. PATENT DOCUMENTS

| | | | |
|---|---|---|---|
| 2,316,011 | 4/1943 | Miller et al. | 252/402 |
| 2,393,801 | 1/1946 | Morey et al. | 252/402 |
| 2,719,827 | 10/1955 | Lowe | 252/391 |
| 3,837,964 | 9/1974 | Cotton et al. | 428/457 |
| 4,350,804 | 9/1982 | Ostrowski et al. | 525/327.3 |
| 4,357,396 | 11/1982 | Grunewalder et al. | 252/391 |

FOREIGN PATENT DOCUMENTS 1050785 12/1966 United Kingdom .
1057871 2/1967 United Kingdom .

OTHER PUBLICATIONS

A. B. Patel et al.—Corrosion Science, vol. 14, 233–237 (1974).
A. B. Patel et al.—J. Electrochem. Soc. India, 22-4, (1973) 321.
K. P. Soni et al.-J. Electrochem. Soc. India, 32-2 (1983) 197.

Primary Examiner—Veronica P. Hoke
Attorney, Agent, or Firm—Godfried R. Akorli

[57] ABSTRACT

This invention relates to 2-mercaptothiazoline-containing resinous protective compositions which can be lead-free compositions for mirror-back coatings which are useful in reducing or preventing corrosion.

3 Claims, No Drawings

MIRROR PROTECTIVE COMPOSITION COMPRISING 2-MERCAPTOTHIAZOLINE

BACKGROUND OF THE INVENTION

1. Field of the Invention

The present invention relates to protective coatings for thin films of metals such as silver, a combination of silver and copper, or the like. More specifically, the present invention relates to protective compositions for mirror-backings comprising thin films of silver and copper, or silver only.

2. Brief Description of the Prior Art

It is known in the art to deposit thin metallic films on substrates for functional and/or aesthetic reasons. For example, thin films of silver are deposited on glass to produce mirrors or other reflective surfaces for purposes such as energy conservation. To preserve the integrity of the thin metallic films, additives, pertinent among which are corrosion inhibitors, are employed therewith. Typical examples of the corrosion inhibitors are lead compounds.

While the lead compounds provide good corrosion inhibition, they have become less desirable because of associated problems of toxicity. Hence, it has become necessary to find alternate or supplemental corrosion inhibitors that are helpful in preserving the integrity of the thin metallic films. The present invention provides such an alternate means of effecting the reduction or prevention of corrosion of thin metallic films.

SUMMARY OF THE INVENTION

In accordance with the foregoing, the present invention is a basic embodiment encompasses a protective composition comprising (a) a thiazoline compound, which is preferably 2-mercaptothiazoline, in admixture with (b) a carrier therefor. The carrier can be a solvent and in such a case a solution of the thiazoline compound such as an aqueous composition of 2-mercaptothiazoline can be employed as the protective composition.

The present invention further encompasses an improved process for preparing a protective coating for a mirror comprising applying a thin protective composition to a mirror having a surface layer of silver, copper, nickel or a mixture thereof, the improvement comprising the protective composition containing a thiazoline compound in admixture with a carrier therefor.

In a particularly preferred embodiment, the invention encompasses a protective composition comprising a resinous reaction product of the thiazoline compound which is preferably 2-mercaptothiazoline. In this embodiment, the composition can be effective as a lead-free protective composition. Surprisingly, resinous reaction products of 2-mercaptothiazoline have been found to produce a marked improvement in protecting silver-only mirrors and appreciable improvement in protecting silver-copper mirrors.

The terms "silver-only" and "silver-copper" mirrors are better understood in the following context. The mirrors which are treated in accordance with the invention may be prepared in several ways. For example, silver may be deposited on glass from a reducing solution of a silver salt, such as an ammoniacal solution of silver nitrate containing dextrose or other reducing sugar. The silvering of glass is often carried out by first "sensitizing" the glass with an aqueous solution of a tin salt. The resultant silvered surface is herein referred to as a "silver-only" mirror. To protect silvered surfaces, thin metallic copper films may be deposited by generally known methods including electrolytic deposition, galvanic deposition, or chemical deposition from solutions of copper salts. A preferred method for use on glass, ceramic, and similar siliceous surfaces is deposition by contacting a previously silvered surface with an aqueous solution containing a copper salt and a reducing agent. A solution containing other metal salts such as a nickel salt, cobalt salt or more than one of these salts can be used in contacting a previously silvered surface. The resultant surface is herein referred to as a "silver-copper" and/or nickel or cobalt mirror. The term "silver-only" as described hereinabove, in essence, denotes that the mirror is "copper-free".

DETAILED DESCRIPTION OF THE INVENTION

In the basic embodiment of the invention, the protective composition comprises a thiazoline compound in admixture with a carrier therefor. Presently, 2-mercaptothiazoline has been found to perform substantially better than other thiazoline compounds. It is, however, envisioned that other thiazoline compounds may be useful herein. Illustrative examples of the other thiazoline compounds can include 2-aminothiazoline, 2-methylthiazoline and 2-mercaptobenzothiazoline. The embodiments of the invention relating to the protective composition are described with particularity as to the 2-mercaptothiazoline. The embodiments of the invention relating to metallized substrates of thin metallic films are as described with particularity to mirrors.

In the basic embodiment, the preparation of the protective composition entails admixing the 2-mercaptothiazoline with the carrier in any manner that would admit to the successful application of the resultant composition to the surface of the mirror. The carrier is typically a solvent. Hence, solutions of the 2-mercaptothiazoline are employed as the protective composition. Illustrative examples of the solvents include water; hydrocarbon solvents such as xylene; ethers such as propylene glycol momomethyl ether; esters such as propylene glycol monomethyl ether acetate; ketones such as methyl amyl ketone; alcohols such as butanol and the like.

The 2-mercaptothiazoline is employed in an amount sufficient to effect the desired corrosion inhibition. In an illustrative embodiment comprising an aqueous composition, the 2-mercaptothiazoline is present in an amount ranging from about 0.1 to 10, and preferably 1 to 5 percent of the total weight of the aqueous composition.

Also, the 2-mercaptothiazoline can be in admixture with organic coating compositions that are intended for application to mirror surfaces. Generally, any compatible organic film-forming composition may be employed. Examples of the organic coating compositions comprise acrylic resins, alkyd resins and the like. The organic coating compositions can be applied to provide a dry film thickness of about 0.2 to about 3 mils.

Yet other carriers such as powdery substances or slurries or the like can be employed. It is also possible to employ the 2-mercaptothiazoline per se, meaning that it would, so to speak, be self-carrying.

In the practice of the basic embodiment of the invention, a mirror that is to be treated can be contacted with the protective composition by way application means. For example, the application means can be immersion or flow contact, e.g., curtain coating techniques and other means such as spraying, roller coating, screen printing, or brushing. When the 2-mercaptothiazoline in the form of a solution is applied to the mirror surface, the pH of the solution should be such as does not adversely attack the surface.

Due to a limited degree of permeability of most organic coatings, the 2-mercaptothiazoline in the appropriate forms may be applied to an already applied dry film or in a wet-on-wet mode. After application, the film surface may be rinsed and dried by any appropriate means.

In accordance with the foregoing, in the basic embodiment of the invention, silver-copper mirrors treated with protective compositions comprising 2-mercaptothiazoline in admixture with a carrier have been found to have good corrosion resistance and resistance to industrial cleaning compositions, particularly those that are solutions of ammonia.

In the particularly preferred embodiment of the invention, the protective composition comprises a reaction product of 2-mercaptothiazoline and a carrier. The carrier is preferably a resinous material or a precursor thereof. The carrier is selected on the basis that the 2-mercaptothiazoline will become an integral part thereof or part of a resin matrix that is formed therewith.

The protective composition comprising the reaction product by itself or in combination with other functional ingredients can be employed as thermoplastic or thermosetting compositions. For example, the 2-mercaptothiazoline reaction product can be employed in combination with air drying oils or the like to form oxidative curable protective compositions; or in combination with ethylenically unsaturated monomers or the like to form free radical initiated addition polymers; or in combination with low temperature curable thermosetting functional groups such as urethane groups. Illustratively, an exoxy resin such as a polyglycidyl ether of a polyphenol can be reacted with 2-mercaptothiazoline to form a resinous reaction product. The reaction product can be used in combination with a linseed oil and appropriate driers to form an airdrying system. Alternately, the reaction product can be used in combination with a reactive acrylic monomer to form a free radical initiated addition system. Other materials such as aziridines or materials to which the 2-mercaptothiazoline can be reacted by, say, Michael addition can be employed.

The 2-mercaptothiazoline is reacted in an amount sufficient to provide effective corrosion inhibition. Typically, the 2-mercaptothiazoline is present in amounts ranging from 0.1 to 55 percent and preferably 5 to 30 percent by weight based on resin solids of the reaction product.

In the practice of this invention, a mirror that is to be treated can be contacted with the protective composition comprising the reaction product of 2-mercaptothiazoline by any of the application means described hereinabove. Preferably, the application is by a curtain-coating method. Hence, there is provided herein an improved process for preparing a protective coating for a mirror comprising applying a protective coating to a silver-only mirror. The improvement comprises the protective coating containing a resinous reaction product of 2-mercaptothiazoline. Surprisingly, the resinous reaction product of 2-mercaptothiazoline can be effective in the absence of commonly employed copper treatment which generally follows the silver treatment.

In the particularly preferred embodiment of the invention, the application of resinous reaction products of 2-mercaptothiazoline has been found to have distinct advantages. Surprisingly, it has been found that the resinous reaction products of 2-mercaptothiazoline provide improved corrosion resistance to silver-only (copper-free) mirror surfaces. This becomes all the more significant when it is realized that the resinous reaction product of 2-mercaptothiazoline provides the improved corrosion resistance in protective coatings which are lead-free.

While the invention is described with particularity as to 2-mercaptothiazoline, other thiazoline compounds as described herein are encompassed thereby. The thiazoline compound can be used in combination with other corrosion inhibitors. Also, while the invention has been described with particularity as to mirrors, other metallized surfaces with thin layers of metal are encompassed hereby. The following nonlimiting examples further describe the invention.

EXAMPLE 1

This example illustrates the use of an aqueous solution of 2-mercaptothiazoline as a protective composition for a silver-copper mirror.

A 5 percent aqueous solution of 2-mercaptothiazoline was applied to a silver-copper mirror by rinsing the mirror with it. The treated surface was then coated with a topcoat comprising a compatible mirror-back coating composition such as MIR-O-CRON, available from PPG Industries, Inc. The coated mirror was cured by flashing followed by baking to 220°–270° F. (104°–132° C.). The cured coating having a film thickness of 1.5 mils was evaluated for corrosion resistance.

The coated mirror from above was subjected to a salt spray (fog) testing according to ASTM B-117-73/DDM 411 modified in that 20 percent instead of 5 percent by weight sodium chloride was used in the salt spray. After 150 hours in the salt spray, the coated mirror showed marked improvement in corrosion inhibition in comparison to coated mirrors without the 2-mercaptothiazoline.

To determine the ability of the protective coating to withstand the deleterious effect of household cleaners such as ammoniacal compositions on mirrors, strips of the coated mirror were exposed to ammonia vapor at room temperature for about 16 to 24 hours before the strips were subjected to the afore-described salt spray test. The test is hereinafter referred to as an ammoniated salt spray test. The mirrors did not show any deleterious effect.

EXAMPLE 2

This example illustrates a resinous reaction product of 2-mercaptothiazoline and methods of preparing and using the same.

The following were used in the preparation:

| Ingredients | Charge 1 Parts by Weight (grams) | Moles |
|---|---|---|
| EPON 1001[1] | 1650 | 1.65 |
| 2-Mercaptothiazoline | 197 | 1.65 |
| DOWANOL PM acetate[2] | 1310 | |
| Charge 2 | | |
| Acrylic acid | 119 | 1.65 |
| IONOL[3] | 3.3 | |
| Phenothiazine | 0.45 | |

-continued

| Ingredients | Charge 1 Parts by Weight (grams) | Moles |
|---|---|---|
| N—methyldiethanolamine | 5.0 | |

[1]Epoxy resin having molecular weight of about 1000, an epoxy equivalent of about 500, available from Shell Chemical Co.
[2]Propylene glycol monomethyl ether acetate, available from Dow Chemical Co.
[3]2,6-ditertiarybutyl para-cresol, available from Shell Chemical In a properly equipped 5-liter flask Charge 1 was heated to 60° C. and held thereat for one hour. Charge 2 was then added and the resulting mixture was heated to 100° C. and held thereat for about 14 hours until an acid value of about 14.0 was attained.

Analysis: Gardner-Holdt viscosity at 25° C. was Z-1, weight average molecular weight by Gel Permeation Chromatography was 3903.

A lead-free mirror-back coating composition comprising the above resinous reaction product (80 percent by weight) and a compatible mirror-back coating composition (20 percent by weight) was formulated and used as follows. The coating was applied to strips of silver-only mirror by a draw-down method and cured. Curing was by an infrared oven to a peak glass bottom temperature of 250° F. (121° C.) to a dry film of 1.5 mils thickness.

Strips of the coated mirror having a dry film thickness of 1.5 mils were subjected to salt spray tests, i.e., basic salt spray, and ammoniated salt spray tests. After 150 hours, the test panels showed no corrosion in either the basic test or the ammoniated salt spray test.

EXAMPLE 3

This example further illustrates the resinous reaction product of an epoxy resin and 2-mercaptothiazoline.

| Ingredients | Charge 1 Parts by Weight (grams) |
|---|---|
| EPON 828 | 224.8 |
| Bisphenol A | 592 |
| *Charge 2* | |
| Ethyltriphenyl phosphonium iodide | 1.2 |
| Xylene | 44 |
| *Charge 3* | |
| 2-Mercaptothiazoline | 12.2 |
| *Charge 4* | |
| Linseed fatty acid | 605.6 |
| Benzyldimethylamine | 0.8 |
| Dibutyltin dilaurate | 2.4 |
| Xylene | 44 |

Charge 1 was heated in a reaction vessel equipped with a stirrer, nitrogen blanket and thermometer to 107° C. Charge 2 was added and the reaction mixture was heated to 130° C. and held for about 30 minutes. The reaction mixture was heated to 180° C., Charge 3 was added and the resultant mixture was held thereat for about 1 hour. Charge 4 was then added and the resultant mixture was held at about 220° C. for about 90 minutes until an acid value of 1.9 was attained.

The resultant epoxy ester resinous reaction product of 2-mercaptothiazoline was formulated into a mirror-back coating comprising 80 percent by weight of the resinous reaction product and 20 percent by weight of a compatible pigmented alkyd resin. The coating was applied by a draw-down method to strips of silver-only and silver-copper mirrors, air-dried and evaluated. The epoxy ester resinous reaction product, particularly when applied as a two-coat system, showed an improved corrosion resistance when compared with a similar coating without 2-mercaptothiazoline.

EXAMPLE 4

This example illustrates a protective composition comprising a resinous reaction product of epoxy resin with 2-mercaptothiazoline and methods of preparing and using the same.

The following were used in the preparation:

| Ingredients | Charge 1 Parts by Weight (grams) | Moles |
|---|---|---|
| EPON 1001 | 440 | 0.4 |
| 2-Mercaptothiazoline | 95.4 | 0.8 |
| DOWANOL PM acetate | 539.4 | |
| *Charge 2* | | |
| Isophorone diisocyanate | 266.4 | 1.2 |
| DOWANOL PM acetate | 336 | |
| Dibutyltin dilaurate | 0.1 | |
| *Charge 3* | | |
| Allyl alcohol | 69.6 | 1.2 |

Charge 1 was heated in a properly equipped reaction vessel to 66° C. and held for about 80 minutes. In a separate reaction vessel, Charge 2 was heated to 40° C. and held thereat for about 2 hours. Over that period of time, Charge 3 was added dropwise to the reaction mixture of Charge 2. With all of Charge 3 added, the resultant mixture was heated to 54° C. and held thereat for about 2 hours and 40 minutes. To the resultant reaction mixture was added the reaction mixture of Charge 1 over a period of about 2 hours and a temperature of 51° C. The reaction mixture was heated to 60° C. and held thereat while additional 0.1 gram of dibutyltin dilaurate was added thereto. The reaction mixture was then held at 60° C. for about 4 hours.

The resultant mixture was cooled to about 44° C. and 5.8 grams additional allyl alcohol was added thereto. The resultant mixture was heated to 70° C. and then held over 70°-72° C. for about 2 hours. The resultant mixture was heated further to 74° C. and additional 0.4 gram of dibutyltin dilaurate was added thereto. The reaction mixture was held at 74° C. for about 8 hours until virtually all of the isocyanate groups had reacted. The resultant mixture had an isocyanate equivalent of 9842, viscosity of H and weight average molecular weight of 3739.

A mirror-back coating composition was formulated, applied and evaluated as follows. The coating comprised 80 percent of the above resinous reaction product and 20 percent of a compatible, lead-free mirror-back coating. The coating composition was drawn down on strips of silver-only and silver-copper mirrors and cured in an infrared oven to a peak glass bottom temperature of 250° F. (121° C.) to a dry film of about 1.5 mils thickness. The films were subjected to the basic salt spray and ammoniated salt spray tests as described herein. The coating comprising the protective composition described herein showed significant improvement over similar but leaded coatings which do not contain 2-mercaptothiazoline.

What is claimed is:

1. In an improved process for preparing a protective coating for a mirror comprising applying a protective composition to the mirror having a surface layer of silver, copper, nickel or a mixture thereof, the improvement comprising using the protective coating comprising a reaction product of:
 (a) 2-mercaptothiazoline, and
 (b) a resinous material or a precursor thereof.

2. A mirror which is prepared by the process of claim 1.

3. A silver-only mirror which is prepared by the process of claim 1.

* * * * *